United States Patent
Guo et al.

(10) Patent No.: US 8,656,310 B2
(45) Date of Patent: Feb. 18, 2014

(54) METHOD AND APPARATUS FOR PERFORMING MULTI-SELECTION

(75) Inventors: Xiaobing Guo, Beijing (CN); Juejia Zhou, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 769 days.

(21) Appl. No.: 12/393,622

(22) Filed: Feb. 26, 2009

(65) Prior Publication Data
US 2009/0217205 A1    Aug. 27, 2009

(30) Foreign Application Priority Data
Feb. 27, 2008    (CN) .......................... 2008 1 0101036

(51) Int. Cl.
*G06F 3/14*    (2006.01)
(52) U.S. Cl.
USPC ............... 715/845; 715/823; 709/206; 707/3; 345/30
(58) Field of Classification Search
USPC ............ 715/200–277, 700–867; 345/30–111; 705/50–79; 709/201–229
See application file for complete search history.

(56) References Cited

U.S. PATENT DOCUMENTS

| | | | |
|---|---|---|---|
| 2005/0222985 A1* | 10/2005 | Buchheit et al. | 707/3 |
| 2007/0038958 A1* | 2/2007 | Gohda | 715/823 |
| 2009/0089381 A1* | 4/2009 | Anderson et al. | 709/206 |

OTHER PUBLICATIONS

Microsoft, Windows XP, 2002, Microsoft, snapshots of working program, p. 1-3.*

* cited by examiner

*Primary Examiner* — Ruay Ho
(74) *Attorney, Agent, or Firm* — Sills, Cummis & Gross P.C.

(57) ABSTRACT

A method and apparatus perform multi-selection. The method comprises: opening and displaying an object group on a display device, the object group comprising at least one object; determining an object corresponding to a first selection instruction from the at least one object based on the first selection instruction, and establishing a first correspondence between the first selection instruction and the object corresponding to the first selection instruction; determining an object corresponding to a second selection instruction from the at least one object based on the second selection instruction, and establishing a second correspondence between the second selection instruction and the object corresponding to the second selection instruction, the second selection instruction being different from the first selection instruction; operating the at least one object based on the first and second correspondences, the operation being conducted according to the first and second selection instructions.

9 Claims, 4 Drawing Sheets

SELECTED
OBJECTS: 37
TOTAL SIZE: 2.4GB

SELECTED
OBJECTS: 20
TOTAL SIZE: 39MB

☑ SELECTED OBJECTS: 37
TOTAL SIZE: 2.4GB

△ SELECTED OBJECTS: 20
TOTAL SIZE: 39MB

METHOD AND APPARATUS FOR PERFORMING MULTI-SELECTION

BACKGROUND OF THE INVENTION

1. Field of Invention

The present invention relates to computer technology, particularly to a method and apparatus for performing multi-selection.

2. Description of Prior Art

In a resource browser, a user may select an appropriate object group and perform a uniform operation on the same. A user may multi-select various objects by means of buttons or a checkbox in order to form an object group, which can improve user's experience. A user interface (UI) on Windows® platform is shown in FIG. 1A. Accordingly, this multi-selection can also be done in many other UIs. In case of email selection, for example, various objects are formed into an object group, as shown in FIG. 1B. Even in a mobile phone, various objects can be formed into an object group when a user list or short messages are selected. The user may select or deselect each of messages, as shown in FIG. 1C.

However, it is found out by the inventors that there are some problems in prior art. In particular, a single object can not be operated according to different selecting standards. In addition, selecting operations carry little information and thus the efficiency of operations is low. In case of browsing files such as photos, for example, an object group comprises many photos of which one part shall be sent to user A, another part shall be sent to user B, and the remaining shall be made to form a backup. In order to achieve above operations, the photos have to be operated in batches, which affects the efficiency seriously.

SUMMARY OF THE INVENTION

In view of this, the object of the present invention is to provide a method and apparatus for performing multi-selection, in order to improve efficiency of operations.

To achieve the object mentioned above, an embodiment of the present invention provides a method for performing multi-selection, comprising:
  opening and displaying an object group on a display device, the object group comprising at least one object;
  determining an object corresponding to a first selection instruction from the at least one object based on the first selection instruction, and establishing a first correspondence between the first selection instruction and the object corresponding to the first selection instruction;
  determining an object corresponding to a second selection instruction from the at least one object based on the second selection instruction, and establishing a second correspondence between the second selection instruction and the object corresponding to the second selection instruction, the second selection instruction being different from the first selection instruction;
  operating the at least one object based on the first and second correspondences, the operation being conducted according to the first and second selection instructions.

The method may further comprise storing the first correspondence after establishing the first correspondence between the first selection instruction and the object corresponding to the first selection instruction.

The method may further comprise storing the second correspondence after establishing the second correspondence between the second selection instruction and the object corresponding to the second selection instruction.

The method may further comprise determining the object group before opening and displaying the object group on a display device.

The method may further comprise storing a total file size of the first and second correspondences.

In particular, storing the first and second correspondences may comprise storing a file list corresponding to the first correspondence and a file list corresponding to the second correspondence.

Preferably, the first selection instruction may comprise at least a first operating command, and the second selection instruction may comprise at least a second operating command different from the first operating command.

In this case, the method may further comprise presetting the first operating command before determining an object corresponding to a first selection instruction from the at least one object based on the first selection instruction. Also, the method may further comprise presetting the second operating command before determining an object corresponding to a second selection instruction from the at least one object based on the second selection instruction.

Another embodiment of the present invention provides an apparatus for performing multi-selection, comprising:
  a selecting device comprising a first selecting unit and a second selecting unit, wherein the first selecting unit is used for determining an object corresponding to a first selection instruction from the at least one object based on the first selection instruction; and the second selecting unit is used for determining an object corresponding to a second selection instruction from the at least one object based on the second selection instruction, the second selection instruction is different from the first selection instruction;
  a control device comprising a first control unit and a second control unit, wherein the first control unit is used for establishing a first correspondence between the first selection instruction and the object corresponding to the first selection instruction; and the second control unit is used for establishing a second correspondence between the second selection instruction and the object corresponding to the second selection instruction;
  an operating device for operating the at least one object based on the first and second correspondences, the operation being conducted according to the first and second selection instructions.

The apparatus may further comprise a storage device connected to the control device. The storage device is used for storing the first and second correspondences.

The apparatus may further comprise an object group determination device connected to the selecting device. The object group determination device is used for determining the object group.

Preferably, the first selection instruction may comprise at least a first operating command, and the second selection instruction may comprise at least a second operating command different from the first operating command.

According to the schemes of embodiments, user operations are facilitated by opening and displaying an object group on a display device, establishing a first and second correspondences, and operating the at least one object based on the first and second correspondences. Thus, the efficiency of operations is improved.

DETAILED DESCRIPTION OF PREFERRED EMBODIMENTS

Figure 1A:
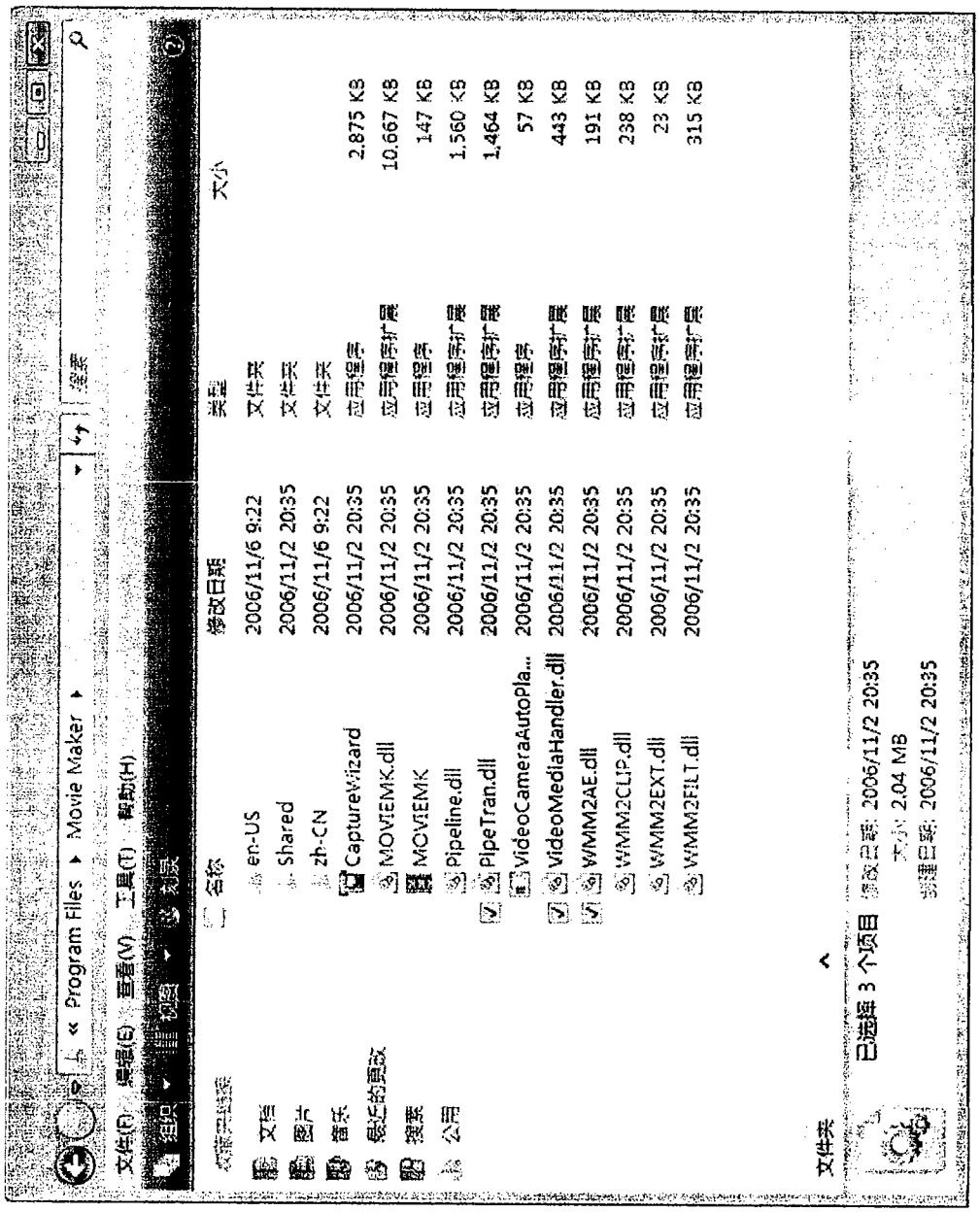
FIG. 1A is a view of an object group on Windows® platform.
Figure 1B:
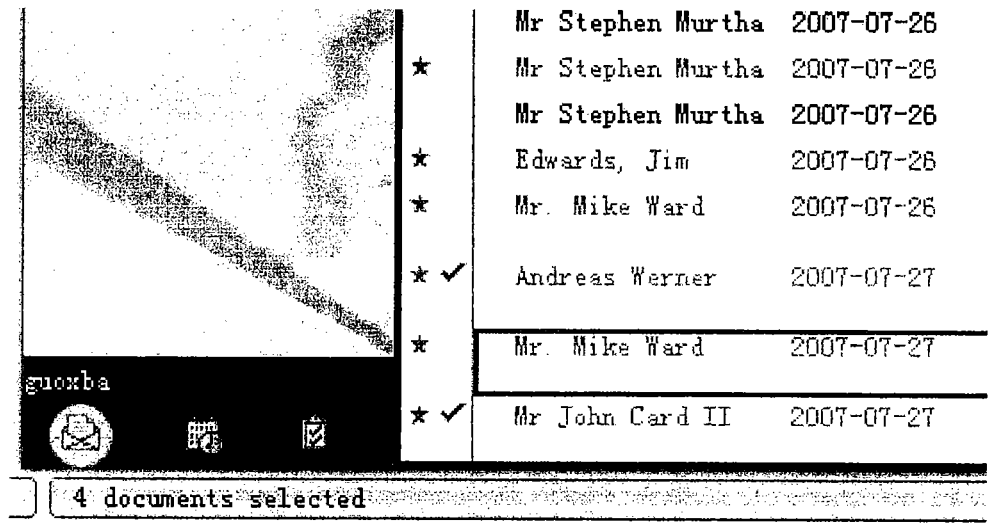
FIG. 1B is a view of an object group in a conventional UI.
Figure 1C:
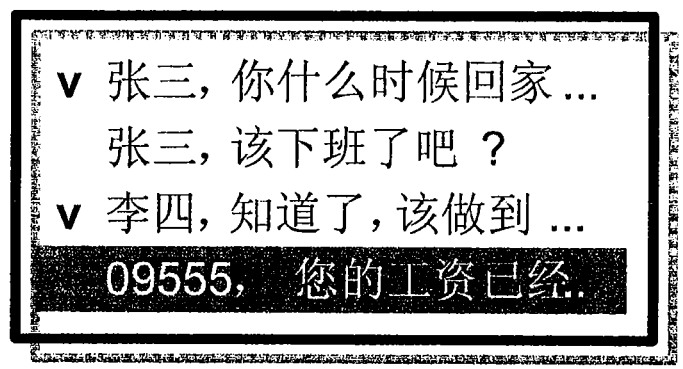
FIG. 1C is a view of an object group in a conventional mobile phone.

In an embodiment of the present invention, an object group is opened and displayed on a display device. The object group comprises at least one object. A first correspondence is established between a first selection instruction and an object corresponding to the first selection instruction, wherein the first selection instruction comprises at least a first operating command. A second correspondence is established between a second selection instruction and an object corresponding to the second selection instruction, wherein the second selection instruction comprises at least a second operating command different from the first operating command. The at least one object is operated based on the first and second correspondences.

Operating commands are options which can be selected for operating an object group by a user. The commands can be preset by a user terminal, or can be set manually by a user according to the number of commands supported at present and requirements. Various operating commands can be set at one time. The operating commands can be set to correspond to file types of objects. In addition, the corresponding operating commands can be set independent of file types of objects. For example, an operating command of "Adding into a playlist" corresponds to a video object or an audio object. Furthermore, a statistical operation is performed on all of objects so that all the possible operating commands corresponding to these objects are displayed.

An object group is determined according to various existing implementations. After this determination, a user determines an object corresponding to a first selection instruction from the at least one object based on the first selection instruction, and establishes a first correspondence between the first selection instruction and the object corresponding to the first selection instruction, wherein the first selection instruction may comprise at least a first operating command. Then, the user determines an object corresponding to a second selection instruction from the at least one object based on the second selection instruction, and establishes a second correspondence between the second selection instruction and the object corresponding to the second selection instruction, wherein the second selection instruction is different from the first selection instruction, and may comprise at least a second operating command different from the first operating command. Thereafter, the user operates the at least one object based on the first and second correspondences, wherein the operation is conducted according to the first and second selection instructions, especially, according to the first and second operating commands.

The first correspondence or the first and second correspondences is/are stored in a user terminal, which updates objects in an object group corresponding to various operating commands timely according to the selection performed by the user. The user terminal may further store a total file size of the first correspondence or the first and second correspondences.

Figures 2, 3:
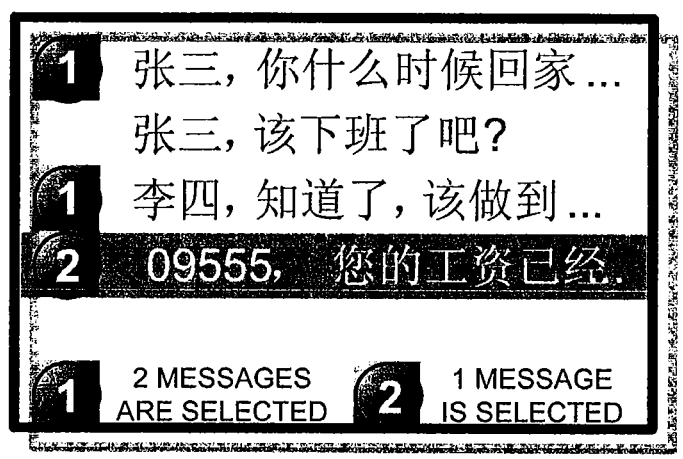
FIG. 2 is a schematic of storage format according to an embodiment of the present invention.
FIG. 3 is a view of an object group according to an embodiment of the present invention.

As shown in FIG. 2, various operating commands correspond to marks of various selection instructions, and the total file sizes corresponding to various correspondences are stored. On the one hand, it will help users to realize the disk space taken up by files. On the other hand, it will help users to realize whether the storage space at the target position is sufficient when copying, cutting, or network transferring is conducted, and to estimate the time required to perform the copying or transferring.

In particular, storing the correspondences between the objects and the operating commands may comprise storing file lists corresponding to the operating commands and adding or deleting files to or from the file lists according to operations performed by users. A view of objects in an object group is shown in FIG. 3.

After an operating command corresponding to various objects in an object group is selected, the objects in a stored file list corresponding to the operating command are operated accordingly.

Figure 4:
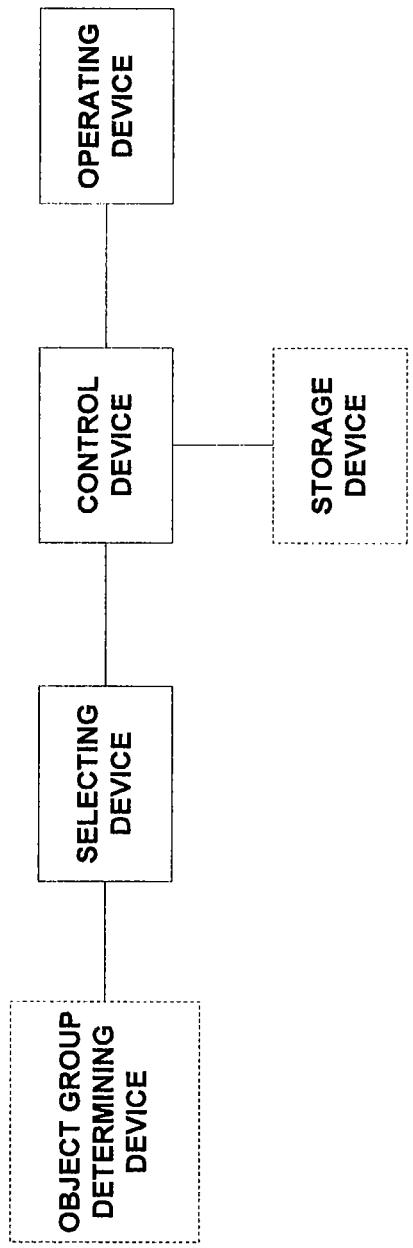
FIG. 4 is a block diagram of an apparatus for performing multi-selection according to an embodiment of the present invention.

FIG. 4 is a block diagram of an apparatus for performing multi-selection according to an embodiment of the present invention. As shown in FIG. 4, the apparatus comprises: a selecting device comprising a first selecting unit and a second selecting unit, wherein the first selecting unit is used for determining an object corresponding to a first selection instruction from the at least one object based on the first selection instruction, the first selection instruction may comprises at least a first operating command; and the second selecting unit is used for determining an object corresponding to a second selection instruction from the at least one object based on the second selection instruction, the second selection instruction is different from the first selection instruction, and may comprises at least a second operating command different from the first operating command; a control device comprising a first control unit and a second control unit, wherein the first control unit is used for establishing a first correspondence between the first selection instruction and the object corresponding to the first selection instruction; and the second control unit is used for establishing a second correspondence between the second selection instruction and the object corresponding to the second selection instruction; an operating device for operating the at least one object based on the first and second correspondences, wherein the operation is conducted according to the first and second selection instructions, especially, according to the first and second operating commands.

Other than the selecting device, the control device, and the operating device, the apparatus may further comprise a storage device connected to the control device. The storage device is used for storing the first and second correspondences.

Other than the selecting device, the control device, and the operating device, the apparatus may further comprise an object group determination device connected to the selecting device. The object group determination device is used for determining the object group.

Other than the selecting device, the control device, and the operating device, the apparatus may further comprise the storage device and the object group determination device mentioned above.

Although some embodiments of the present invention have been shown and described, it will be appreciated by those skilled in the art that many improvements and changes can be made without departing from the principles and spirits of the invention which is solely defined by the following claims.

What is claimed is:

1. A computer-implemented method for performing multi-selection, comprising:

opening and displaying an object group on a display device, the object group comprising at least one object;

selecting according to a first selection instruction an object from the object group into a first group;

selecting according to a second selection instruction an object from the object group into a second group, wherein the objects belonging only to the first group are symbolized by a first type of icon, the objects belonging only to a second group are symbolized by a second type of icon different from the first type of icon, and the objects belonging to both the first and the second groups are symbolized by both the first type of icon and the second type of icon; and performing, by a processor, a first operation on the objects belonging only to the first group, and a second operation on the objects belonging only to the second group, and both of the first and second operations on the objects belonging to both of the first and second group, upon completing both of the first and second selections, wherein the first operation is different from the second operation.

2. The method according to claim 1, further comprising: storing the result of the first selection in an electronic data storage device.

3. The computer-implemented method according to claim 2, further comprising: storing the result of the second selection in the electronic data storage device.

4. The computer-implemented method according to claim 3, wherein the step of storing the result of the first selection comprises storing the object selected by using the first selection instruction into a first file list, and the step of storing the result of the second selection comprises storing the object selected by using the second selection instruction into a second file list.

5. The computer-implemented method according to claim 2, further comprising: storing a total file size of the first group and a total file size of the second group in the electronic data storage device.

6. The computer-implemented method according to claim 1, further comprising: determining the object group before opening and displaying the object group on a display device.

7. The computer-implemented method according to claim 1, further comprising: storing a total file size of the first group and a total file size of the second group in an electronic data storage device.

8. The computer-implemented method according to claim 1, further comprising: presetting the first operation before selecting the object according to a first selection instruction.

9. The computer-implemented method according to claim 1, further comprising: presetting the second operation before selecting the object according to the first selection instruction.

* * * * *